United States Patent
McGraw

(10) Patent No.: US 6,723,951 B1
(45) Date of Patent: Apr. 20, 2004

(54) METHOD FOR REESTABLISHING HOLES IN A COMPONENT

(75) Inventor: Julie M. McGraw, Oviedo, FL (US)

(73) Assignee: Siemens Westinghouse Power Corporation, Orlando, FL (US)

(*) Notice: Subject to any disclaimer, the term of this patent is extended or adjusted under 35 U.S.C. 154(b) by 0 days.

(21) Appl. No.: 10/454,800

(22) Filed: Jun. 4, 2003

(51) Int. Cl.⁷ .............................................. B23K 26/38
(52) U.S. Cl. ................................................ 219/121.71
(58) Field of Search ...................... 219/121.67, 121.7, 219/121.71, 121.72, 121.82, 121.83, 121.85

(56) References Cited

U.S. PATENT DOCUMENTS

| | | | |
|---|---|---|---|
| 4,008,444 A | * 2/1977 | Zar et al. ................ | 372/29.011 |
| 4,017,721 A | 4/1977 | Michaud | |
| 4,145,714 A | 3/1979 | MacDonald et al. | |
| 4,738,508 A | 4/1988 | Palmquist | |
| 5,012,523 A | 4/1991 | Kobayashi et al. | |
| 5,125,036 A | 6/1992 | Raghavan et al. | |
| 5,216,808 A | 6/1993 | Martus et al. | |
| 5,418,345 A | 5/1995 | Adamski | |
| 5,941,686 A | 8/1999 | Gupta et al. | |
| 6,127,689 A | 10/2000 | Pryor et al. | |
| 6,163,035 A | 12/2000 | Shibayama et al. | |
| 6,172,331 B1 | 1/2001 | Chen | |
| 6,329,015 B1 | 12/2001 | Fehrenbach et al. | |
| 6,339,208 B1 | 1/2002 | Rockstroh et al. | |
| 6,362,446 B1 | 3/2002 | Jones et al. | |
| 6,368,060 B1 | 4/2002 | Fehrenbach et al. | |
| 6,380,512 B1 | 4/2002 | Emer | |
| 6,381,366 B1 | 4/2002 | Taycher et al. | |
| 6,408,610 B1 | 6/2002 | Caldwell et al. | |
| 6,420,677 B1 | 7/2002 | Emer et al. | |
| 6,466,324 B1 | 10/2002 | Doran | |
| 6,524,395 B1 | 2/2003 | Devine, II | |
| 2002/0076097 A1 | 6/2002 | Vaidyanathan | |
| 2003/0037436 A1 | 2/2003 | Ducotey, Jr. et al. | |
| 2003/0038121 A1 | 2/2003 | Christensen | |

* cited by examiner

*Primary Examiner*—Samuel M. Heinrich

(57) ABSTRACT

A method for determining the angular orientation of a hole in a component relative to the component's surface includes the step of angularly varying a machine vision system and a hole in a component relative to each other such that the machine vision system views the hole at a plurality of angles. The machine vision system determines the angular orientation of the hole relative to the component surface by detecting the angle at which the greatest amount of light emanates from the hole. The machine vision system and the hole in the component can be angulary varied relative to each other by moving the machine vision system at various angles relative to the hole in the component, or by moving the component at various angles relative to the machine vision system. The component can be a turbine engine component.

20 Claims, 3 Drawing Sheets

METHOD FOR REESTABLISHING HOLES IN A COMPONENT

FIELD OF THE INVENTION

The invention relates in general to methods for reestablishing holes in components having one or more holes and, more particularly, to such methods for reestablishing holes in turbine engine components having one or more cooling holes extending through the thickness of the component.

BACKGROUND OF THE INVENTION

Turbine engine components operating in the hot sections of the engine experience temperatures that can contribute to a decrease in the operating life of the components. Such components include, for example, transitions, turbine blades and turbine vanes. To improve component life, the components are designed to permit cooling air to flow through the interior of the components and exit through carefully configured cooling holes formed in the component. Engineering considerations require the cooling holes to be drilled at specific angles with respect to the outer surface of the component. While in service, the cooling holes can become obstructed by debris or due to the infiltration of undesired substances or contaminants into the cooling air path.

In order to further maximize their full life potential, turbine components undergo routine repair or refurbishment including clearing the cooling holes from blockage. However, even during the repair/refurbishment process itself, the cooling holes can become fully or partially obstructed by, for example, coating material applied to the component. Regardless of the source of the blockage, the cooling holes must be cleared or reestablished so that the component can function as required by design.

Current techniques used to reestablish cooling holes rely on the original part manufacturing coordinates. Some techniques include a locating application such as a vision system to assist in locating the presence and general position of a cooling hole opening at the component surface. One example of a vision system used in a method for removing coating material from a cooling hole is disclosed in U.S. Pat. No. 6,380,512.

However, none of the current techniques ensure that the geometry of the cooling hole or the angle at which the cooling hole is oriented relative to the surface of the component is maintained. Failure to do so can have adverse consequences, especially when the outer surface of a turbine engine component has become distorted during operation or service. When the original manufacturing coordinates are used to align a drilling device with the opening in a component that is even slightly distorted, the drill may actually be misaligned with the angular orientation of the opening because the original reference points or datums may have shifted position during operation. A hole drilled at a misaligned angle can result in cooling holes that are oversized, at the wrong angle, or otherwise having an altered geometry. Such deviations from the original design can adversely affect the efficiency of the cooling of the part and, ultimately, the life of the part itself.

While the above problems have been described in connection with turbine engine components, such problems may arise in the context of any component having one or more openings.

Therefore, it is an object of the present invention to provide a process for not only determining the general location of a hole opening in a component, but also for determining the angular orientation of a hole relative to the component surface. It is a further object of the present invention to positionally and angularly align a drilling device with the hole so that the drilling device can clear the hole without deforming or damaging the component or altering the intended design geometry or configuration of the hole.

SUMMARY OF THE INVENTION

In one aspect, the present invention is directed to a method for determining the angular orientation of a hole in a component relative to the component's surface. One step of the method includes angularly varying a machine vision system and a hole in a component relative to each other, allowing the machine vision system to view the hole at a plurality of angles so that the machine vision system can determine the angular orientation of the hole relative to the component surface by detecting the angle at which the greatest amount of light emanates from the hole. The component can be a turbine engine component. The machine vision system and the hole in the component are angularly varied relative to each other by (a) moving the machine vision system at various angles relative to the hole in the component or (b) moving the component at various angles relative to the machine vision system. In the former case, the machine vision system can be moved hemispherically about the hole in the component. The method can further include the step of positioning a light source relative to the component so that light shines through the hole in the component toward the machine vision system. Additional steps can include aligning a drill with the centerline of the hole at the angular orientation of the hole relative to the component surface as determined by the machine vision system, and drilling the hole so as to substantially clear any obstructions from the hole. The drill can be a laser. The method may still further include the step of scanning the surface of the component with the machine vision system to identify the presence of the hole in the component.

In another aspect of the present invention involves a method for reestablishing an opening in a component. Steps include: (a) backlighting a component having at least one hole so that light can pass through the at least one hole in the component; (b) scanning an outer surface of the component with a machine vision system to generally locate the at least one hole; (c) angularly varying the machine vision system and the at least one hole relative to each other so that the machine vision system views the hole at a plurality of angles, the machine vision system being programmed to determine the angular orientation of the at least one hole relative to the outer surface of the component by detecting the angular orientation at which the greatest amount of light emanates from the opening; and (d) drilling the at least one hole in the component at the angular orientation determined by the machine vision system. The machine vision system and the hole in the component can be angularly varied relative to each other by either moving the machine vision system relative to the component or by moving the component relative to the machine vision system or by moving both the component and the machine vision system. The machine vision system can scan generally perpendicular to the outer surface of the component in a predefined area. The vision system includes a camera, a vision processor, and a video monitor. The component may be placed upon a multi-axis table.

In still another aspect, the present invention relates to a method for reestablishing an opening in a turbine engine component. The method can include the following steps: (a) placing a turbine engine component atop a multi-axis table controlled by a CNC, the component having a surface including at least one hole; (b) backlighting the component so as to allow light to emanate from the at least one hole in the component; (b) scanning the component surface with a machine vision system to locate the at least one hole; (c) varying the angle at which the machine vision system views the hole by positioning the machine vision system at various angles relative to the at least one hole in the component so that the machine vision system can determine the angular orientation of the at least one hole relative to the component surface by detecting the angle at which the greatest amount of light emanates from the hole, the machine vision system further determining the centerline of the hole; (d) aligning a laser with the at least one hole at the angular orientation determined by the machine vision system; and (e) laser drilling the hole substantially along the centerline of the hole so as to substantially remove any obstructions from the hole while maintaining the geometry of the hole and the orientation at which the hole was originally cut is maintained. The turbine engine component can be a transition, turbine vane or turbine blade, and the at least one opening can be a cooling hole. The CNC can be programmed to control the multi-axis table, the laser and at least part of the machine vision system.

DETAILED DESCRIPTION OF EMBODIMENTS OF THE INVENTION

Aspects of methods of the present invention address the shortcomings of current techniques by not only identifying the general location of a hole opening at the surface of a component, but also by determining the angular orientation of a hole through the component wall relative to an outer surface of the component. The aspects of such methods will ensure that the holes are drilled at the correct angle so as to be substantially free of obstructions but without altering the conformation of the hole or deforming or damaging the component.

Figure 2:
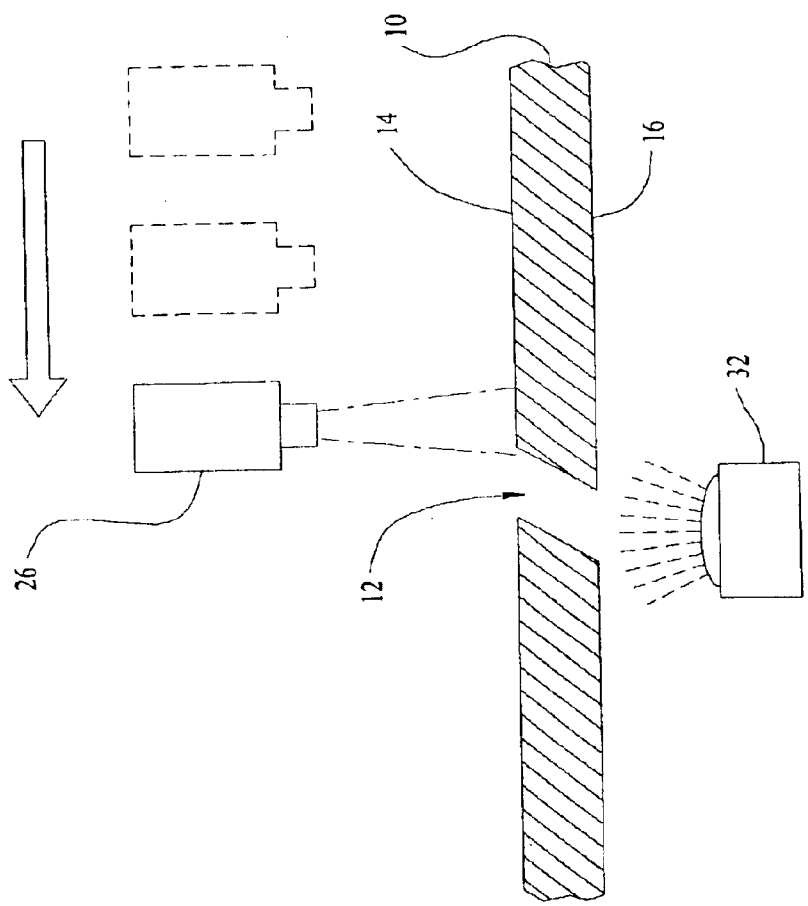
FIG. 2 is a sectional view through a hole in the component showing an aspect of another embodiment of the method of the present invention.
Figure 3:
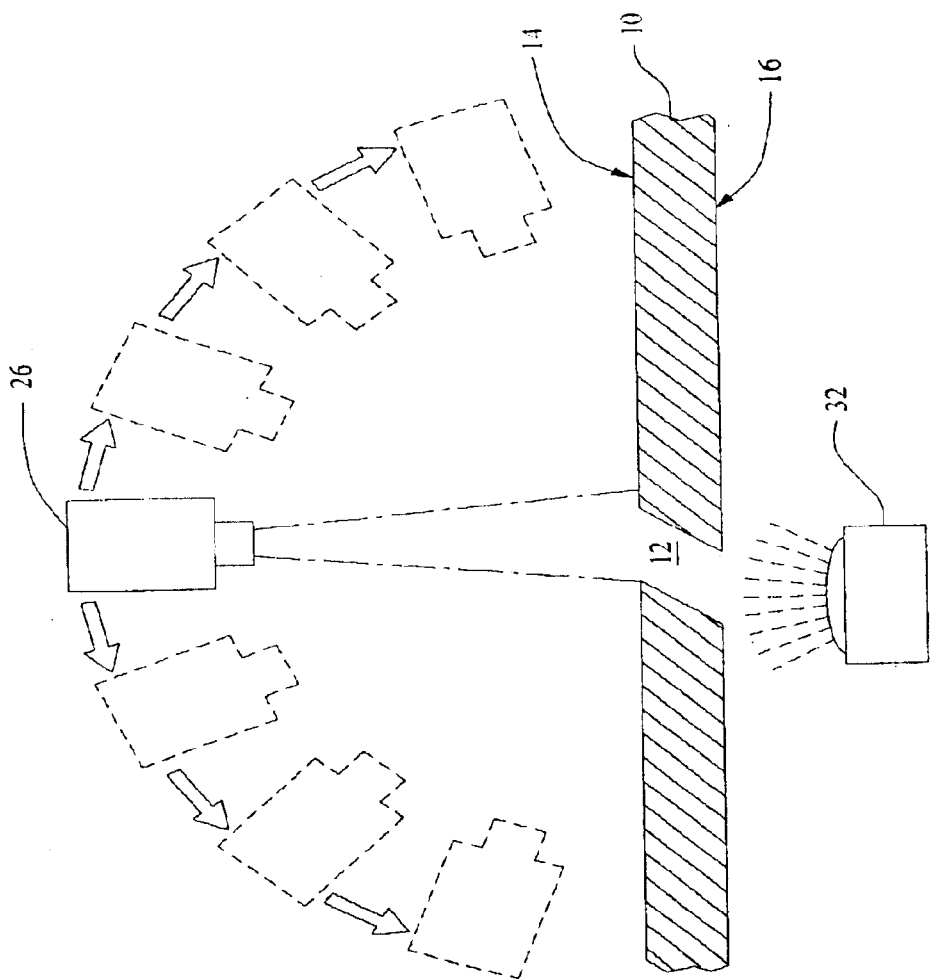
FIG. 3 is a sectional view through a hole in the component showing an aspect of the method of the present invention in which the camera and component are angularly varied with respect to each another.

Embodiments of the invention will be explained in the context of reestablishing cooling holes in gas turbine engine components, but the detailed description is intended only as exemplary. Embodiments of the invention are shown in FIGS. 1–3, but the present invention is not limited to the illustrated structure or application.

Figure 1:
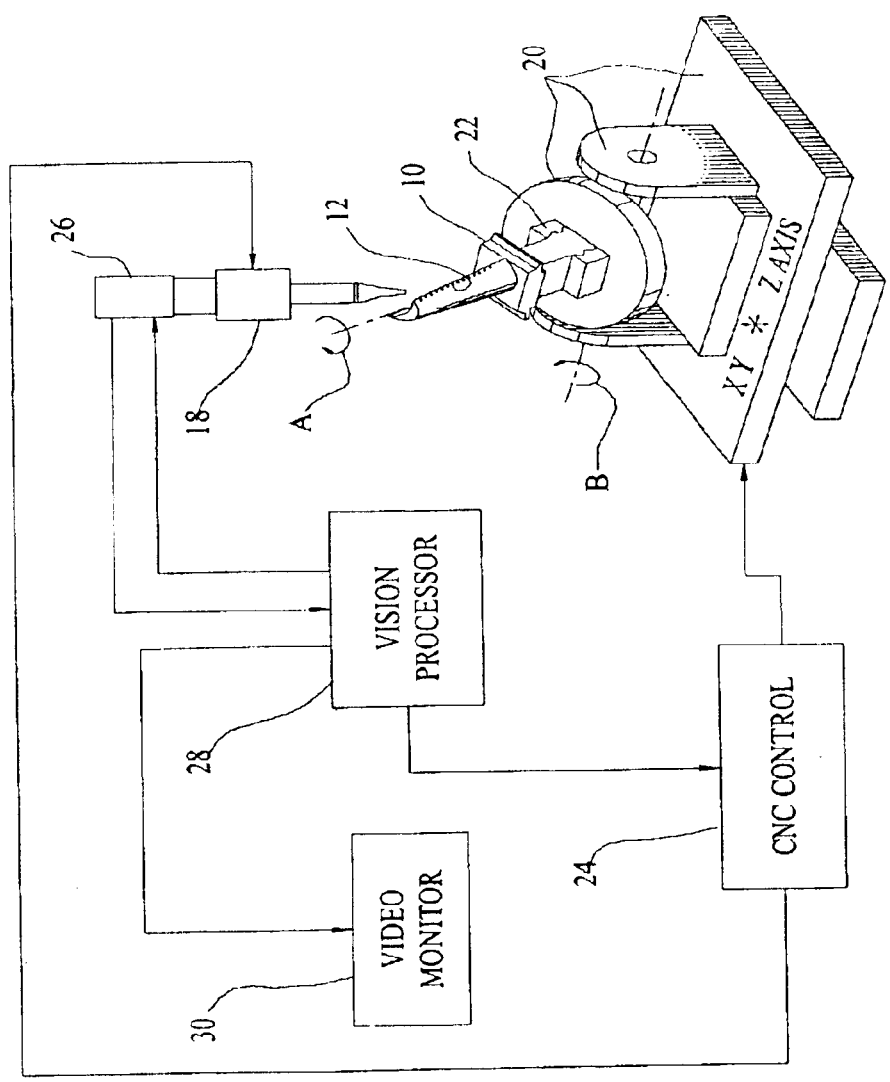
FIG. 1 is a diagrammatic view of an aspect of an embodiment of the method of the present invention.

Referring to FIG. 1, a diagram is shown of one possible embodiment of a process for reestablishing cooling openings in a gas turbine engine component. However, the process can be applied in sundry applications. Depending on the specific application, a variety of devices may be used to facilitate the objects of the invention. Some of the various devices that can be used will be examined in turn below.

Aspects of the present invention relate to determining the angular orientation of a hole in a component relative to the outer surface of a component. The component 10 can be any component having at least one hole 12 extending through the thickness of the component 10. The component 10 can be an individual part, a part of an assembly, the assembly itself or a sub-assembly. Preferably, the component 10 is a gas turbine engine component, especially one that operates in the hot gas path, like transitions, blades or vanes. These components have internal passageways and exit holes for coolant flow.

The component 10 has a first surface 14 which can be the outer surface of the component 10. The component 10 also has a second surface 16 that can be an opposite outer surface, or the second surface 16 may be an interior surface of the component 10. In any case, at least one hole 12 extends through the component 10 between the first and second surfaces 14, 16 such that there are hole openings in each surface. While the hole 12 is preferably generally cylindrical in conformation, the hole 12 can be any of a variety of shapes such as polygonal or rectangular. The hole 12 may be oriented at any angle with respect to the component's outer surface 14.

Another component that can be used in accordance with aspects of the present invention is a drill 18 for clearing or otherwise reestablishing the hole 12 through the component 10. Preferably, the drill 18 is a laser such as a neodymium yttrium-aluminum-garnet (Nd:YAG) laser, excimer laser or some other high-powered industrial laser. The application at hand will dictate the particular laser to use and also the parameters at which the laser operates (i.e., wavelength, duration, frequency, energy). The drill 18 can also be a conventional drill, a water jet or an electronic discharge machine (EDM). In short, the drill 18 can be any device that removes material blocking the hole 12 in the component 10 without damaging the component itself. However, in certain instances, the drill 18 may be used to alter the hole 12 itself such as enlarging the diameter of the hole while retaining the same centerline, or it can be used to shape a new hole geometry. Again, the particular: application will dictate the range of suitable drills 18, but the preferred drill 18 is a laser.

A method according to aspects of the present invention can further include use of a surface 20 for supporting the component 10 or a surface 20 upon which the component 10 can rest. Preferably, the surface 20 is a multi-axis table. However, the surface 20 may be a conventional table or other surface, substantially planar or otherwise, on which the component can be set atop or even a fixture or jig.

The multi-axis table 20, as shown in FIG. 1, has a 3 axis (XYZ) positioning table and a rotate and tilt table (AB), for linear and angular positioning, and includes a fixture 22 for holding component 10 in position as the camera/laser 26,18 and/or the table 20 are moved to the proper position for each hole 12 in the component 10 to determine the actual hole 12 opening location and the angular orientation of the hole 12.

The table 20 may include a fixture 22 for holding the component 10 in position as the table 20 is moved to properly position the component relative to the laser drill 18. It is also possible to hold the component 10 stationary in the fixture 22 while the laser apparatus 18 is moved relative to the component 10 using a suitable positioning device such as the vision processor,sa computer numerical control (CNC) machine or an industrial robot.

Ideally, the multi-axis table 20 is controlled by a computer numerical control (CNC) machine 24. Alternatively, the multi-axis table 20 may also be controlled by some other similar programmable component positioning system, such as an industrial robot. The CNC 24 can also be used for positioning and moving the component 10 and the laser 18 relative to each other to focus the laser beam on any partially or completely blocked cooling holes 12 for removal of the obstruction. The CNC 24 can control the laser 18 as well as the multi-axis table 20.

The CNC component program can be used to move portions of a machine vision system, which can further be used as part of a method according to aspects of the present invention. The machine vision system can be any of a number of machine vision systems that are known in the art. Preferably, the machine vision system includes a camera 26, a vision processor 28, and a video monitor 30. The camera 26 can be a conventional video camera, digital camera or scanner; the camera 26 can be any of a variety of cameras including standard monochrome, composite color, RGB color, non-standard monochrome, progressive scan, line-scan or custom CCD arrays. In short, the camera 26 can be any camera so long as it generates a signal from an image of the component and provides the signal to the vision processor 28. As illustrated in FIG. 1, the vision system camera 26 can be mounted to the laser 18 to obtain an image through the laser lens system or it may be completely separate from the laser (as shown in FIGS. 2–3).

The machine vision system further comprises a vision processor 28 that receives signals from the camera 26. The vision processor 28 can be a computer such as a mainframe, laptop or personal computer. Moreover, the vision processor 28 can include software or be programmed, in any suitable language, to carry out the steps and functions of aspects of the invention described. Instead of using a computer and software, the vision processor 28 can comprise dedicated electronic image processing hardware.

The vision processor 28 can process and store information received from the camera 26. The vision processor 28 may operatively interact with other components such as the CNC 24, the laser 18, the video monitor 30 and possibly still other components. The operative interaction or association may be direct or indirect, unidirectional or bidirectional. For example, the vision processor 28 may be able to control the laser 18 operation, or it may be able to control the positioning of the component 10 and/or laser 18 relative to each other. The vision processor 28 may further be able to measure the intensity of light emanating from a given surface or opening in the surface. The vision processor 28 may also be able to measure the difference of light intensity between two parts of an image such as adjacent regions of a part under examination.

The video monitor 30 of the machine vision system permits viewing of the evaluation and laser drilling process in real time by a human operator. The video monitor 30 may receive signals directly from the camera 26 or it may receive an image indirectly from the camera 26 through the vision processor 28.

An operator console (not shown) may further be provided so that the operator can communicate with the machine vision system and override or modify the location and/or orientation values stored by the vision processor 28. The operator can thus check the actual location and orientation of the holes 12 determined by the vision system and override any erroneous locations.

A method according to aspects of the present invention may further include use of a light source 32 to illuminate the component 10 for optimal data acquisition.

Any light source 32 may be employed including, for example, filament, fluorescent, incandescent, iridescent, halogen or discharge lamps or lights. Alternatively, the light source 32 may be LEDs or lasers or fiber optics. Any light source 32 will suffice so long as it facilitates the acquisition of data by the machine vision system such as by generating a high-contrast image of the component 10 under scrutiny.

The light source 32 itself can have any of a number of shapes and sizes as well as a variety of intensities. In addition, the light source 32 may include a reflector to channel the light toward the hole 12 in the component 10. When used, the light source 32 is preferably placed behind or inside of the component 10 to backlight the part so that light will emanate from the opening 12 in the component 10 toward the machine vision system. The light source 32 may be positioned anywhere with respect to the component 10 so long as it assists the machine vision system in identifying the presence of the hole 32 opening or the angular orientation of the hole 32 relative to the component's outer surface 14. Furthermore, the light source 32 need not remain in one location during the process. Depending on the operating environment, the light source 32 may not be needed at all.

Having described the individual components that may be used in methods according to aspects of the present invention, one illustrative manner in which these components can be used will now be described. The following description is merely an example of a sequence in which the individual steps can occur. The described steps can be performed in almost any order and not every step described must occur.

Referring to FIG. 1, a gas turbine component 10 having at least one hole 12 is placed on a multi-axis table 20, which is preferably controlled by a CNC 24. The component 10 can simply rest atop the table or it can be mounted in a fixture 22 as shown.

Next, a light source 32 is placed adjacent to the component 10 so that light will shine or emanate from the hole 12 in the component 10. As shown in FIGS. 2–3, the light source 32 can be placed behind the component 10 or, if the configuration of the component 10 permits, it can be placed inside of the component 10. In either case, the additional light emanating from the light source 32 can aid in the machine vision system's acquisition of data by providing extra light and, thus, a greater contrast with the surrounding material of the component 10 itself.

A machine vision system is provided having a vision processor 28, a camera 26 and a video monitor 30. The vision processor 28 is operatively associated with the camera 26, CNC control 24 and video monitor 30. The operative association, may be unidirectional or bidirectional in nature. As illustrated in FIG. 1, the camera 26 can be attached to the laser 18.

The machine vision system is programmed so that the camera 26 will scan the component surface 14 to detect the presence of one or more pre-existing holes 12 in the component 10. Ideally, the camera 26 scans in a pre-defined area. It is also preferable if the camera 26 scans generally perpendicular to the component surface 14 as shown in FIG. 2. "Generally perpendicular" includes true perpendicular as well variations therefrom such as between about 80 and about 100 degrees or between about 85 and about 95 degrees. However, the camera 26 is not limited to scanning at any particular orientation with respect to the component surface 14. Indeed, the camera 26 can scan the component surface 14 at any angle so long as the camera 26 can detect the holes 12 in the component 10. Any of a number of scanning patterns may be used. Furthermore, the scanning may be done manually by an operator or it can be done automatically by the vision processor 28 or CNC 24 according to a set program. Once a hole 12 is identified, the machine vision system can process and record the location or coordinates of the hole 12.

Next, the camera 26 and the component 10 are angularly varied as shown in FIG. 3. "Angularly varied" means that the angle at which the vision system camera 26 views the hole 12 in the component 10 is varied. Changing the camera's view can be accomplished in several ways. The preferred manner is to have the camera 26 move relative to a stationary component 10 while keeping the hole 12 within the view of the camera 26. In this case, the camera 26 is moved to various points, preferably hemispherically around the hole 12 opening in the component surface 14 as shown in FIG. 3, so that the vision system can determine the amount of light emanating from the hole 12 at that point. The movement of the camera 26 may be done manually by an operator or automatically according to a predetermined program. The vision processor 28 may be programmed to record data at discrete points or it may be programmed to continuously accept data as the camera is rotated about the hole 12 opening. Preferably, the machine vision system records data at discrete positions. It is further preferable if the multiple points of measurement are equidistant or substantially equidistant from the hole 12 opening at the component surface 14. The movement of the camera 26 can be controlled by the vision processor 28.

The arrangement of moving the camera 26 while holding the component 10 stationary is especially suited for larger components such as transitions that are cumbersome to move; however, the arrangement also lends itself to relatively smaller components such as blades and vanes. Alternatively, the part 10 may be moved while the vision camera 26 is held in a fixed position; such an arrangement is more conducive to parts such as vanes and blades. Yet another possibility for achieving angular variation is to have both the vision camera 26 and the component 10 move relative to each other. Regardless of the particular manner in which angular variation is achieved, the vision processor 28 stores and processes information relating to positional coordinates, angular orientation, and the amount of light emanating from the opening. Upon collection of the data, the vision processor 28 can determine the position and angular orientation at which the greatest amount of light emanates from the hole 12 opening. From that positional data, the vision system can then compute or otherwise determine the centerline of the hole 12 through the component 10.

The laser 18, as controlled by the CNC 24 or vision processor 28, is aligned with the hole 12 in the component surface 14. In other words, the laser 18 is positioned such that a beam from the laser 18 is in substantial alignment with the centerline of the hole 12 in the component 10.

Finally, the laser 18 is operated to drill 18 the hole 12 so as to remove any obstructions from the hole 12 and to preserve original geometry of the hole 12 and the orientation at which the hole 12 was originally cut in the component 10. In carrying out the above steps, there is little or no destruction of the material surrounding the hole 12.

It will of course be understood that the invention is not limited to the specific details described herein, which are given by way of example only, and that various modifications and alterations are possible within the scope of the invention as defined in the following claims.

What is claimed is:

1. A method for determining the angular orientation of a hole in a component relative to the components surface comprising the step of:

angularly varying a machine vision system and a hole in a component relative to each other such that the machine vision system views the hole at a plurality of angles, wherein the machine vision system determines the angular orientation of the hole relative to the component surface by detecting the angle at which the greatest amount of light emanates from the hole.

2. The method of claim 1 wherein the component is a turbine engine component.

3. The method of claim 1 wherein the machine vision system and the hole in the component are angularly varied relative to each other by moving the machine vision system at various angles relative to the hole in the component.

4. The method of claim 3 wherein the machine vision system is moved hemispherically about the hole in the component.

5. The method of claim 1 wherein the machine vision system and the hole in the component are angularly varied relative to each other by moving the component at various angles relative to the machine vision system.

6. The method of claim 1 further including the step of positioning a light source relative to the component so that light shines through the hole in the component toward the machine vision system.

7. The method of claim 1 further comprising the steps of:

aligning a drill with the centerline of the hole at the angular orientation of the hole relative to the component surface as determined by the machine vision system; and drilling the hole so as to substantially clear any obstructions from the hole.

8. The method of claim 7 wherein the drill is a laser.

9. The method of claim 1 further including the step of:

scanning the surface of the component with the machine vision system to identify the presence of the hole in the component.

10. A method for reestablishing an opening in a component comprising the steps of:

backlighting a component having at least one hole so that light can pass through the at least one hole in the component;

scanning an outer surface of the component with a machine vision system to generally locate the at least one hole;

angularly varying the machine vision system and the at least one hole relative to each other so that the machine vision system views the hole at a plurality of angles, the machine vision system being programmed to determine the angular orientation of the at least one hole relative to the outer surface of the component by detecting the angular orientation at which the greatest amount of light emanates from the opening; and drilling the at least one hole in the component at the angular orientation determined by the machine vision system.

11. The method of claim 10 wherein the machine vision system and the hole in the component are angularly varied relative to each other by moving the machine vision system relative to the component.

12. The method of claim 10 wherein the machine vision system and the hole in the component are angularly varied relative to each other by moving the component relative to the machine vision system.

13. The method of claim 10 wherein the machine vision system and the hole in the component are angularly varied relative to each other by moving both the component and the machine vision system.

14. The method of claim 10 wherein the machine vision system scans generally perpendicular to the outer surface of the component in a predefined area.

15. The method of claim 10 wherein the vision system includes a camera, a vision processor, and a video monitor.

16. The method of claim 10 wherein the component is placed upon a multi-axis table.

17. A method for reestablishing an opening in a turbine engine component comprising the steps of:

placing a turbine engine component atop a multi-axis table controlled by a CNC, the component having a surface including at least one hole;

backlighting the component so as to allow light to emanate from the at least one hole in the component;

scanning the component surface with a machine vision system to locate the at least one hole;

varying the angle at which the machine vision system views the at least one hole by positioning the machine vision system at various angles relative to the at least one hole in the component, wherein the machine vision system determines the angular orientation of the at least one hole relative to the component surface by detecting the angle at which the greatest amount of light emanates from the at least one hole, the machine vision system further determining the centerline of the at least one hole;

aligning a laser with the at least one hole at the angular orientation determined by the machine vision system; and laser drilling the at least one hole substantially along the centerline of the at least one hole so as to substantially remove any obstructions from the at least hole while maintaining the geometry of the at least hole and the orientation at which the at least one hole was originally cut is maintained.

18. The method of claim 17 wherein the turbine engine component is selected from the group consisting of transitions, turbine vanes or turbine blades.

19. The method of claim 17 wherein the at least one hole is a cooling hole.

20. The method of claim 17 wherein the CNC is programmed to control the multi-axis table, the laser and at least part of the machine vision system.

* * * * *